United States Patent
Han

(10) Patent No.: US 7,916,597 B2
(45) Date of Patent: Mar. 29, 2011

(54) METHOD FOR WRITING OPTICAL DISC

(75) Inventor: Cheul Kyung Han, Sungnam-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 1024 days.

(21) Appl. No.: 11/544,696

(22) Filed: Oct. 10, 2006

(65) Prior Publication Data

US 2007/0086296 A1    Apr. 19, 2007

(30) Foreign Application Priority Data

Oct. 11, 2005 (KR) .................. 10-2005-0095380

(51) Int. Cl.
*G11B 7/00* (2006.01)

(52) U.S. Cl. ............... 369/53.23; 369/44.11; 369/44.28; 369/47.37

(58) Field of Classification Search ............... 369/53.23, 369/53.24, 47.28, 47.29
See application file for complete search history.

(56) References Cited

U.S. PATENT DOCUMENTS

| | | | |
|---|---|---|---|
| 4,607,358 A | 8/1986 | Maeda et al. | |
| 6,377,527 B1* | 4/2002 | Hirashima | 369/53.23 |
| 6,646,961 B1* | 11/2003 | Iida et al. | 369/44.26 |
| 6,751,174 B1* | 6/2004 | Takahashi | 369/47.37 |
| 2003/0021202 A1* | 1/2003 | Usui et al. | 369/47.39 |
| 2003/0210631 A1 | 11/2003 | Tung et al. | |
| 2005/0207300 A1 | 9/2005 | Jo et al. | |
| 2006/0104163 A1 | 5/2006 | Kim | |

FOREIGN PATENT DOCUMENTS

| | | |
|---|---|---|
| CN | 1459779 A | 12/2003 |
| KR | 10-2003-0030572 A | 4/2003 |
| KR | 10-2004-0043939 A | 5/2004 |

* cited by examiner

*Primary Examiner* — Van N Chow
(74) *Attorney, Agent, or Firm* — Birch, Stewart, Kolasch & Birch, LLP

(57) ABSTRACT

An optical disk writing method including determining a writing scheme for recording information on the optical disc based on received tracking error signals. The method also includes moving an optical pickup across tracks of the optical disc while the optical pickup emits a laser beam, counting a number of the tracking error signal, and determining a storage capacity of the optical disc based on the counted number of tracking error signals.

12 Claims, 2 Drawing Sheets

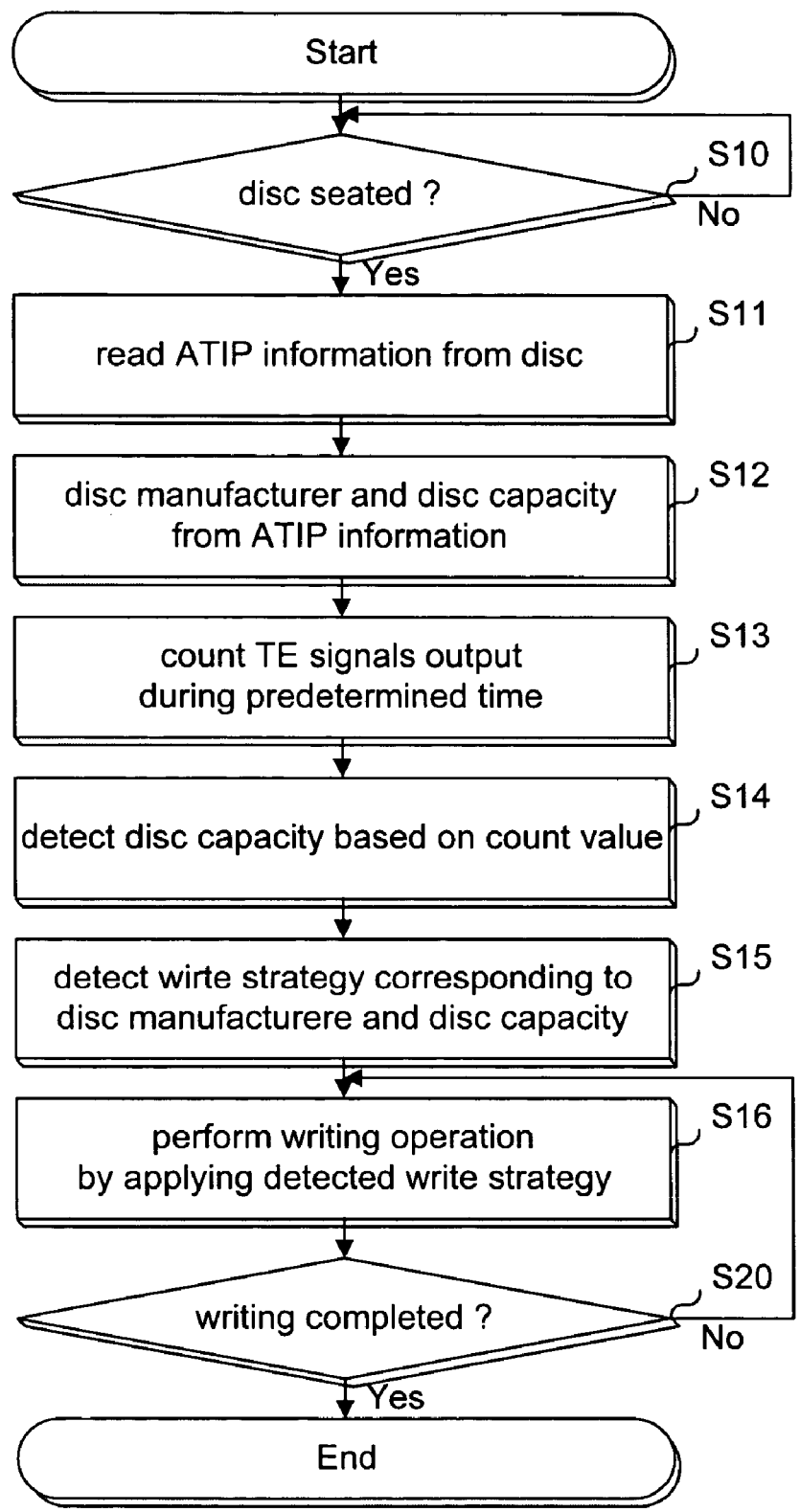

METHOD FOR WRITING OPTICAL DISC

This application claims priority to Korean application No. 10-2005-0095380 filed in Korea on Oct. 11, 2005, the entire contents of which is incorporated by reference in its entirety.

BACKGROUND OF THE INVENTION

1. Field of the Invention

The present invention relates to an optical disc writing method, and more particularly to an optical disc writing method that detects an actual storage capacity of an optical disc and applies a writing scheme based on the detected storage capacity.

2. Description of the Related Art

Typically, writable optical discs such as CD-Rs and DVD-Rs are manufactured in slightly different ways. Accordingly, even when data is written by the same optical disc device, the writing or reproduction quality may vary depending on the disc manufacturer. Further, writable optical discs of the same type, e.g., CD-Rs, may have different storage capacities such as a storage capacity of 74 minutes or 80 minutes. Thus, the data is written on the disc in different ways according to each manufacturer and the disc's storage capacity.

Accordingly, optical writing schemes for each manufacturer and for each disc storage capacity are detected in advance. Further, the detected write strategies are stored in an Electrically Erasable Programmable Read-Only Memory (EEPROM), for example, of a writable optical disc device. In addition, an optical disc includes Absolute Time In Pregroove (ATIP) information including Disc Additional Information (DAI) such as DAI I indicating a manufacturing date of the disc, a DAI II indicating a manufacturer of the disc, and a DAI III indicating a storage capacity of the disc.

Therefore, an optical disc device detects the disc manufacturer and capacity from the ATIP information, reads the previously stored write strategy from the memory according to the detected manufacturer and disc capacity, and performs a writing operation using the read write strategy. Current optical discs also include high capacity discs. For example, if a disc has a standard capacity of 74 minutes, an optical disc having a capacity of more than 80 or 90 minutes is also available. Thus, because the discs have different storage capacities, the disc manufacturer writes the exact disc capacity in the ATIP information.

However, the actual disc capacity may be different than the disc capacity written in the ATIP information due to an error, such as in the disc manufacturing process, etc. For example, the ATIP information may indicate the disc capacity is 80 minutes, but the actual disc capacity may be 90 minutes. In this instance, because the optical disc device writes data using a write strategy corresponding to 80 minutes even though the disc capacity is 90 minutes, the capacity of the optical disc is wasted.

Similarly, the ATIP information may indicate the disc capacity is 90 minutes, but the disc actually only has a capacity of 80 minutes. In this instance, because the optical disc drive writes data using the write strategy corresponding to 90 minutes, the writing process will fail if the data capacity to be written exceeds the actual capacity.

Furthermore, in the above two cases, because a write strategy corresponding to the actual capacity is not applied, the writing quality in the periphery of the disc is deteriorated.

SUMMARY OF THE INVENTION

Accordingly, one object of the present invention is to address the above-noted and other problems.

Another object of the present invention is to provide an optical disc writing strategy that is based on the actual storage capacity of the disc rather than on the storage capacity stored in the ATIP information.

To achieve the above objects, according to one aspect of the present invention, there is provided an optical disk writing method including determining a writing scheme for recording information on the optical disc based on received tracking error signals.

According to another aspect, the present invention provides an optical disk drive including an optical pickup configured to record data on an optical disk, a driver configured to drive the optical pickup across tracks of the optical disc, a tracking error counter configured to count tracking error signals while the optical pickup is driven across the tracks of the optical disc, and a microprocessor configured to determine a writing scheme for recording the optical disc based on the counted tracking error signals.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, wherein:

FIG. 2 is a flowchart illustrating an optical disc writing method in accordance with an embodiment of the present invention.

DETAILED DESCRIPTION OF PREFERRED EMBODIMENTS

Figure 1:
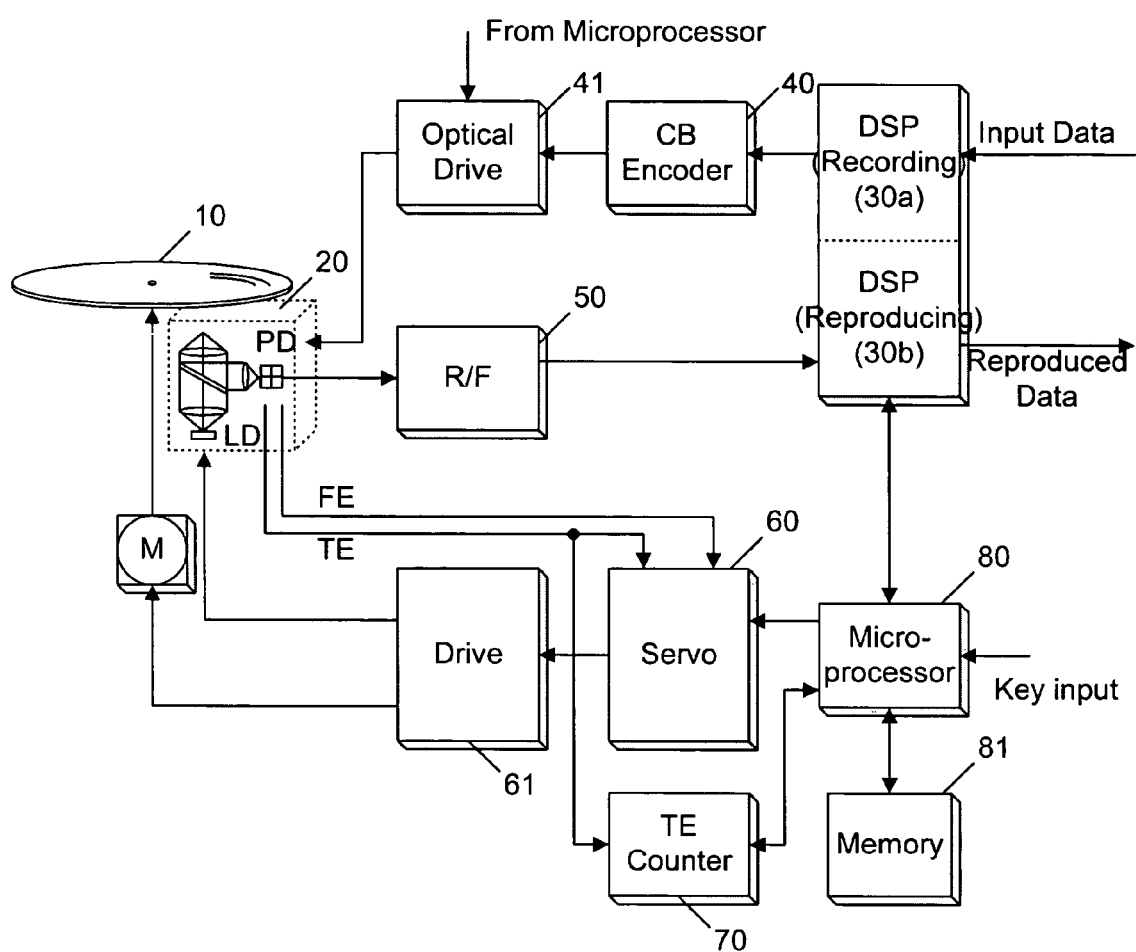
FIG. 1 is a block diagram of an optical disc device in accordance with an embodiment of the present invention.

Hereinafter, a preferred embodiment of the present invention will be described with reference to the accompanying drawings.

FIG. 1 is a block diagram of an optical disc device in accordance with an embodiment of the present invention. As shown, the optical disc device includes a digital recording signal processor 30a, a digital reproduction signal processor 30b, a channel bit encoder 40, and an optical drive unit 41. Also included is an optical pickup 20, an R/F unit 50, a drive unit 61, a servo unit 60, a TE counter 70, an Electrically Erasable Programmable Read-Only Memory (EEPROM) 81, and a microprocessor 80.

In addition, the digital writing signal processor 30a adds an error correcting code or the like to input digital data, and converts the digital data to a recording format data. The channel bit encoder 40 converts the converted data to a bitstream, and the optical drive 41 outputs optical drive signals according to signals received from the channel bit encoder 40. Further, the optical pickup 20 writes data on an optical disc 10 according to the optical drive signals and also reads data from the optical disc 10. The R/F unit 50 performs filtering and wave shaping on signals output from the optical pickup 20 to thereby output binary signals.

Also, the digital reproduction signal processor 30b restores the original data from the binary signals using its internal clock that is phase-synchronized with the binary signals. The drive unit 61 operates a spindle motor M for rotating the optical disc 10 and moves the optical pickup 20. In addition, the servo unit 60 controls the operation of the drive unit 61 based on the FE (Focusing Error) and TE (Tracking Error) servo error signals from the optical pickup 20 and a rotational speed of the optical disc 10.

Further, the TE counter 70 counts the detected TE signals, and the EEPROM 81 stores optimal write strategies corresponding to disc storage capacities according to disc manufacturers (disc codes). Also, the microprocessor 80 detects an actual disc capacity based on both the ATIP information on the optical disc 10 and values counted by the TE counter 70, and performs a writing operation by applying an optimal write strategy based on the detected disc capacity.

Turning now to FIG. 2, which is a flowchart illustrating an optical disc writing method in accordance with one embodiment of the present invention. Hereinafter, the method of FIG. 2 will be described in detail with reference to the optical disc device of FIG. 1.

As shown in FIG. 2, when the optical disc 10 is seated (Yes in S10), the microprocessor 80 controls both the servo 60 and the drive unit 61 to move the optical pickup 20 to the location of the ATIP information on the optical disc 10, and controls the optical pickup 20 to read the ATIP information (S11). Further, the microprocessor 80 detects a disc manufacturer and a disc capacity from the read ATIP information (S12). The microprocessor 80 also controls the optical pickup 20 so that a laser beam output from the optical pickup 20 moves across tracks, and controls the TE counter 70 to count tracking error signals output according to the movement of the laser beam (S13).

In addition, an optical disc typically has different track pitches according to its storage capacity. For example, the optical disc has a track pitch of about 1.6 μm for a standard data storage capacity of 80 minutes. Further, for an optical disc with a storage capacity of 90 minutes, the track pitch will be smaller than that of the optical disc of the standard capacity. That is, the greater number of tracks the laser beam traverses while moving a predetermined distance, the larger capacity of the optical disc. Accordingly, the microprocessor 80 determines the capacity of the optical disc 10 based on the number of tracks which the laser beam traverses.

In addition, the microprocessor 80 controls the servo 60 and the drive unit 61 to move the optical unit 20 to traverse tracks on the optical disc. In more detail, the microprocessor 80 controls the movement of the optical unit 20 as well as the movement of an objective lens included in the optical pickup. For example, the microprocessor 80 computes a distance the optical pickup has moved with reference to both the amplitude of driving signals applied to a sled motor (not shown) for moving the optical pickup and a time at which the driving signals have been applied. Further, it is also possible to determine a movement speed of the optical pickup 20 from the sensitivity of the sled motor and the amplitude of driving signals. In addition, because a general sled motor is a step motor, it is possible to determine the movement distance of the optical pickup 20 based on the number of steps applied to the sled motor.

Next, the objective lens included in the optical pickup is also moved within the optical unit 20. In more detail, the optical unit 20 moves in increments of 2 microns, for example, and the objective lens is moved in increments of 0.4 microns within the optical unit 20. Thus, a greater resolution is provided. Further, the microprocessor 80 computes a distance the laser beam has moved with reference to both the amplitude of driving signals applied to an actuator for moving the objective lens and a time at which the driving signals have been applied.

Thus, according to an embodiment of the present invention, the microprocessor 80 detects the storage capacity of the optical disc 10 based on a tracking error (TE) signal count value (the number of traversed tracks) (S14). In addition, when the TE count value exceeds a value corresponding to a standard capacity of 80 minutes, for example, the microprocessor 80 determines the capacity of the optical disc 10 as 90 minutes, for example. Otherwise, the microprocessor 80 determines the capacity of the optical disc 10 as being 80 minutes (e.g., a standard capacity).

The reason the microprocessor 80 determines the disc capacity from the TE count value even though the microprocessor 80 has detected the disc capacity from the ATIP information is for when the disc capacity recorded in the ATIP information is different from the actual storage capacity of the optical disc. Thus, the microprocessor 80 can determine the reliability of the previously detected disc capacity indicated in the ATIP information by detecting the disc capacity based on the count value of the TE signals. That is, when the disc capacity detected from the TE count value coincides with the disc capacity detected from the ATIP information, the microprocessor 80 reads the manufacturer preset write strategy from the memory 81 (S15), and performs the requested writing operation using the manufacturer preset write strategy (S16 and S20).

Alternatively, when the disc capacity detected from the TE count value does not coincide with the disc capacity indicated in the ATIP information, the microprocessor 80 ignores the disc capacity indicated in the ATIP information, reads a write strategy from the memory 81 corresponding to the disc capacity detected from the TE count value, and performs the requested writing operation using the write strategy read from the memory 81.

Thus, according to an embodiment of the present invention, it is possible to detect an exact capacity of an optical disc. Therefore, even when the actual disc capacity has been erroneously written on the optical disc, it is possible to perform a writing operation using a writing scheme suitable for the actual storage capacity of the optical disc.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An optical disc writing method, comprising:
   moving an objective lens across tracks of an optical disc while a laser beam is emitted;
   counting a number of tracking error signals;
   determining a storage capacity of the optical disc being proportional to the counted number of tracking error signals; and
   determining a writing scheme for recording information on the optical disc based on the determined storage capacity of the optical disc.

2. The method as claimed in claim 1, wherein determining the storage capacity of the optical disc determines the storage capacity based on both the counted number of the tracking error signals and information written on the optical disc.

3. The method as claimed in claim 2, wherein the information written on the optical disc corresponds to Absolute Time In Pre-groove (ATIP) information including a manufacturer and a predetermined storage capacity of the optical disc.

4. The method as claimed in claim 1, wherein determining the writing scheme determines the writing scheme based on both a manufacturer and the determined storage capacity of the optical disc.

5. The method as claimed in claim 4, further comprising:
determining the manufacturer of the optical disc by reading Absolute Time In Pre-groove (ATIP) information written on the optical disc.

6. The method as claimed in claim 1, further comprising:
performing a writing operation on the optical disc using the determined writing scheme.

7. An optical disc drive, comprising:
an optical pickup configured to record data on an optical disc;
a driver configured to drive the optical pickup across tracks of the optical disc;
a tracking error counter configured to count a number of tracking error signals while an objective lens of the optical pickup is driven across the tracks of the optical disc; and
a microprocessor configured to determine a storage capacity of the optical disc based on the counted number of tracking error signals and to determine a writing scheme for recording the optical disc based on the determined storage capacity of the optical disc.

8. The disc drive as claimed in claim 7, wherein the microprocessor determines the storage capacity of optical disc based on both the counted number of the tracking error signals and information written on the optical disc.

9. The disc drive as claimed in claim 8, wherein the information written on the optical disc corresponds to Absolute Time In Pre-groove (ATIP) information including a manufacturer and a predetermined storage capacity of the optical disc.

10. The disc drive as claimed in claim 7, wherein the microprocessor determines the writing scheme based on both a manufacturer and the determined storage capacity of the optical disc.

11. The disc drive as claimed in claim 10, wherein the microprocessor determines the manufacturer of the optical disc by reading ATIP information written on the optical disc.

12. The disc drive as claimed in claim 7, wherein the microprocessor performs a writing operation by applying the determined writing scheme.

* * * * *